UNITED STATES PATENT OFFICE.

DAVID WEISER, OF MILWAUKEE, WISCONSIN.

IMPROVED COMPOSITION FOR FILLING IN FIRE-PROOF SAFES.

Specification forming part of Letters Patent No. 12,882, dated May 15, 1855.

*To all whom it may concern:*

Be it known that I, DAVID WEISER, of Milwaukee, Milwaukee county, and State of Wisconsin, have invented a certain new and useful composition of matter for making fire-proof linings or filling for safes, rooms, or other compartments to render them fire-proof; and I do hereby declare the following to be a full and exact description of the materials, and mode of preparing and using the same.

The nature of my invention consists in the use of the composition of materials hereinafter mentioned, and of which specimens are herewith submitted, marked and labeled as follows, to wit: No. 1, ashes of peat or pit-coal; No. 2, paper-stuff, for which may be substituted wool-cardings, hair, &c.; No. 3, solution of water-glass; No. 4, clay; No. 5, salt-water. The properties of these ingredients and their utility in my composition, as forming a cheap, indestructible, non-conducting filling or lining for making fire-proof safes, will be apparent from the following description.

First. Ashes of peat or pit-coal, being indestructible by fire, forms the base or principal part of my composition. The peat-ashes I consider preferable, though either answers a good purpose.

Second. Paper-stuff may be obtained from the paper-mills or prepared by maceration of waste paper, paper-boards, &c. This is dissolved in water, and when mixed with the other ingredients forms a perfect non-conductor of heat. It also serves to give consistency to the mass. Wool or hair cut in small pieces may serve as a substitute; but I deem the paper-stuff preferable, and therefore use it.

Third. Water-glass (or a silicate of soda or a silicate of potash, or a compound of silicate with both these alkalies) dissolved in hot water, and the solution evaporated to a sirup-like consistency having a specific gravity of 1.25 gives the solution of water-glass to be used for my purpose. This acts as a glue to bind the paper-stuff and other ingredients together, and at the same time protects it from the action of the heat.

Fourth. The clay is of the ordinary kind, and used principally in the composition to give it plasticity.

Fifth. The salt-water may be sea-water or water saturated with salt, and when added to the composition acts by its affinity upon the water-glass and forms a kind of enamel over the whole mass as soon as it comes under the influence of the fire, and consequently protects it from the effects of the surrounding heat.

The mode of preparing and using composition for lining or filling the walls of fire-proof safes is by taking about the proportion of three pounds of the paper-stuff, which is reduced to a pulp. To this is added about the proportion of twenty-four pounds of well sifted ashes and nine pounds of clay, and as much water-glass and salt-water added as will form, when properly kneaded and worked, a plastic paste. This paste or composition of matter is then made up in the requisite form and dried, or while in the plastic state is at once pressed into the space to be filled to make the safe fire-proof. These precise proportions may be varied and the same beneficial results obtained, because the main value of the invention consists in the combined use of the several ingredients, and not so much to their precise proportions.

Every one skilled in the art will be able to make the composition, and will be the best judge of the proportions to be used, and therefore the proportions given, though perfectly correct, may be considered but as approximative when it is admitted that the use of the entire composition forms the value of the invention, rather than in the nice proportions of the materials composing it.

Having now described my invention and the mode of preparing and using the same, I will proceed to state what I claim and desire to secure by Letters Patent of the United States.

The employment and use of the composition of matter substantially as hereinbefore set forth, as a fire-proof filling or lining for fire-proof safes or other rooms, compartments, or places required to be made fire-proof.

DAVID WEISER.

Witnesses:
OTTO PROST GROESSWETTER,
WILLIAM COLDITZ.